United States Patent
Murashige et al.

(10) Patent No.: US 7,205,745 B2
(45) Date of Patent: Apr. 17, 2007

(54) PORTABLE POWER SOURCE SYSTEM

(75) Inventors: Shinji Murashige, Hirakata (JP); Futoshi Tanigawa, Fujisawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 452 days.

(21) Appl. No.: 10/614,008

(22) Filed: Jul. 8, 2003

(65) Prior Publication Data
US 2004/0013938 A1    Jan. 22, 2004

(30) Foreign Application Priority Data
Jul. 16, 2002    (JP) ............... 2002-206795

(51) Int. Cl.
| H01M 10/44 | (2006.01) |
| H01M 10/46 | (2006.01) |
| H01M 2/00 | (2006.01) |
| H01M 2/10 | (2006.01) |
| H01M 10/38 | (2006.01) |
| H02J 7/00 | (2006.01) |
| H02J 7/04 | (2006.01) |
| H02J 7/16 | (2006.01) |

(52) U.S. Cl. .................. 320/101; 320/152; 429/65; 429/123
(58) Field of Classification Search .......... 320/101, 320/152, 104, 112, 107; 429/65, 96–100, 429/123
See application file for complete search history.

(56) References Cited

U.S. PATENT DOCUMENTS

| 5,294,496 | A | * | 3/1994 | Sato ............... 429/65 |
| 5,608,304 | A | * | 3/1997 | Okumura ............... 320/134 |
| 5,872,444 | A | * | 2/1999 | Nagano et al. ............... 320/106 |
| 2003/0085686 | A1 | * | 5/2003 | Haga et al. ............... 320/112 |

FOREIGN PATENT DOCUMENTS

JP    2001-135287    5/2001

* cited by examiner

Primary Examiner—Karl Easthom
Assistant Examiner—Yalkew Fantu
(74) Attorney, Agent, or Firm—McDermott Will & Emery LLP

(57) ABSTRACT

In a portable power source system comprising a battery pack for accommodating at least one secondary battery and a mounting part for mounting the battery pack, the mounting part is disposed in power using equipment, the battery pack comprises a charge circuit having a charge terminal and a discharge circuit having a discharge terminal, the charge circuit comprises a control circuit for controlling a voltage and a current during charging, the mounting part comprises a protruding external terminal for connecting with the discharge terminal, the battery pack comprises an inserting part for inserting the external terminal, the discharge terminal is disposed in a concealed position inside the inserting part, the battery pack is movable from an initial position to a fixing position while the external terminal has been inserted in the inserting part, and connection between the external terminal and the discharge terminal is achieved at the fixing position.

9 Claims, 14 Drawing Sheets

(a)

(b)

PORTABLE POWER SOURCE SYSTEM

BACKGROUND OF THE INVENTION

As power using equipment which uses a portable power source system, there are for example electric tools such as electric screwdrivers for use in the screw fastening work. The use of electric tools can significantly improve work efficiency. While electric tools have recently been available at home improvement centers and the like and come to be used for do-it-yourself, they have been mainly used in construction sites and the like for business purpose.

There are however some cases where a construction site or the like is not wired. Further, the presence of cords or the like may negatively affect working performance. For this reason, a battery pack is employed in electric tools which operate at relatively low voltage, such as screwdrivers. A typical battery pack accommodates plural secondary batteries therein as a power source. Such a battery pack is detachable and, for conducting charging, it is inserted into a charger specific to the battery pack. On a construction site or the like, even when a battery is run down halfway through the work, preparation of a spare battery pack allows replacement of the battery pack and continuation of the work.

The battery pack (Model No. EZ9025) for the electric tool (DRILL & DRIVER, Model No. EZ6225) manufactured by Matsushita Electric Works, Ltd., one of the examples of the conventional battery packs, is described by reference to FIGS. 15 to 17.

FIG. 15 is an oblique view of the battery pack (EZ9025), and FIG. 16 is a top plan view thereof. At the time of insertion of the battery pack into the electric tool, the battery pack is positioned by a guide 1 to be inserted, and then fixed to the electric tool with a latch 2. On the upper end of the battery pack disposed while being exposed to the outside are a positive electrode terminal 3 both for charging and discharging, a charge negative electrode terminal 4 specifically for charging, a discharge negative electrode terminal 5 specifically for discharging, and a thermistor terminal 6.

FIG. 17 shows a circuit diagram of the battery pack (EZ9025). A discharge circuit comprising the positive electrode terminal 3, a secondary battery 7 and the discharge negative electrode terminal 5 is not provided with a current regulating device, whereas a charge circuit comprising the positive electrode terminal 3, the secondary battery 7 and the charge negative electrode 4 is provided with a control circuit 8 and a thermal protector 9, securing safety during charging. Further, a thermistor 10 is connected to the thermistor terminal 6. During charging, the temperature of the battery pack is monitored with resistance values of the thermistor 10 to control charging according to the monitored temperatures.

As thus described, the conventional battery pack comprises the current regulating device in the charge circuit. The current regulating device will prevent a current from continuing to flow in the battery pack if the charger should suffer a breakdown. However, the discharge circuit is not provided with a current regulating device because there are cases where a heavy current temporarily flows and a total amount of the discharge current is regulated by the capacity of the secondary battery.

In the conventional battery pack, it is possible to charge the battery pack by connection between the discharge terminal and a large-sized battery such as a battery for automobiles, since the discharge terminal is in a state of exposure to the outside. There however is a safety problem in charging by the use of the discharge terminal because of the absence of the current regulating device in the discharge circuit.

For the purpose of protecting terminals of a battery pack from shock caused by dropping and the like, there has been proposed a structure where an external terminal is provided on the inner circumferential side of a lid of a loop-shaped battery pack (Japanese Laid-Open Patent Publication No. 2001-135287). Also in this structure, however, the discharge terminal is in a state of exposure to the outside and the connection between the discharge terminal and the large-sized battery is therefore possible.

BRIEF SUMMARY OF THE INVENTION

The present invention was made in view of what were described above, and relates to a portable power system having a so-called double action system, particularly aiming at provision of a portable power source system where connection between a discharge terminal of a battery back and an external terminal is achieved only when power using equipment is used.

A portable power source system in accordance with the present invention comprises a battery pack for accommodating at least one secondary battery and a mounting part for mounting the battery pack. The battery pack is detachable from the mounting part and exchangeable with a spare battery pack. The mounting part is disposed in power using equipment.

The battery pack comprises a charge circuit having a charge terminal and a discharge circuit having a discharge terminal, and the charge circuit comprises a control circuit for controlling a voltage and a current during charging.

The mounting part comprises a protruding external terminal for connecting with the discharge terminal of the discharge circuit, the battery pack comprises an inserting part for inserting the external terminal, and the discharge terminal is disposed in a concealed position inside the inserting part.

The battery pack is movable from an initial position to a fixing position while the external terminal of the mounting part has been inserted in the inserting part, and connection between the discharge terminal of the discharge circuit and the external terminal is achieved at the fixing position.

Above mentioned "the discharge terminal is disposed in a concealed position" means that the discharge terminal of the discharge circuit and the external terminal are not mutually connected in the initial position immediately after the insertion of the external terminal of the mounting part into the inserting part. The connection between the external terminal and the discharge terminal requires rotation of the battery pack from the initial position or sliding thereof in a direction different from the inserting direction. In such a structure, even when a lead wire or the like connected to a large-sized battery or the like is inserted into the inserting part, the lead wire cannot be connected to the discharge terminal. Hence the act of charging from the discharge terminal is prevented to secure safety.

Each of the charge terminal and the discharge terminal can comprise both a positive electrode terminal and a negative electrode terminal. In this case, the negative electrode terminal of the charge circuit and the negative electrode terminal of the discharge circuit are mutually electrically independent whereas the positive electrode terminal of the charge circuit and the positive electrode terminal of the discharge circuit are united and can employ the structure having the equivalent potential. Such a structure enables reduction in production cost because the charge circuit and discharge circuit comprise the common positive electrode terminal. Further, there is an advantage in this structure that the lead wire to be led out from the secondary battery and the common positive electrode terminal of the charge circuit and the discharge circuit can be constituted by a single metal part.

As for the metal part used can be metal plate in the form of a strip with an L-shaped top. For example, part of the top of the metal plate is disposed in a concealed position to serve as the positive electrode terminal in the discharge circuit; any of the other parts of the metal plate is exposed to the outside to serve as the positive electrode terminal of the charge circuit.

It is preferable that the battery pack comprises a thermistor terminal for temperature measurement. When the battery pack comprises the thermistor terminal, it is possible to charge the battery while measuring the temperature of the battery pack during charging.

It is further preferable that the charge circuit comprises a thermal protector. As for the thermal protector used can be conventionally known ones such as a thermostat, a PTC device and a thermal fuse. In the case where the charge circuit comprises the thermal protector, high safety can be secured even when a lead wire or the like connected to a large-sized battery is connected to the charge circuit.

With the discharge terminal disposed in a concealed position, there is no need for the discharge circuit to comprise a current regulating device. In the conventional configuration, on the other hand, it is essential for securing safety that the discharge circuit comprise the current regulating device especially when the secondary battery is a lithium-ion secondary battery. It is greatly advantageous that the discharge circuit does not need to comprise the current regulating device.

As the charge circuit comprises at least the control circuit, the charge terminal is not required to be concealed but may be exposed to the outside. When the charge terminal is exposed to the outside, the external terminal of the charger and the charge terminal of the battery pack can be mutually connected by a single action, i.e. insertion.

The portable power source system in accordance with the present invention is effective especially when the secondary battery is a lithium-ion secondary battery. For, the lithium ion secondary battery in particular requires protection since it is weak against overcharge.

The portable power source system in accordance with the present invention is suitable for a power source system for use in electric tools, electric vacuum cleaners, electric bicycles or electric motorbikes.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Embodiment 1

In the following, a description is given by reference to the drawings.

In the present embodiment, a portable power source system having a double action system in which an external terminal provided on a mounting part of an electric screwdriver as power using equipment is inserted into an inserting part of a battery pack, and the battery pack is then rotated.

Figure 1:
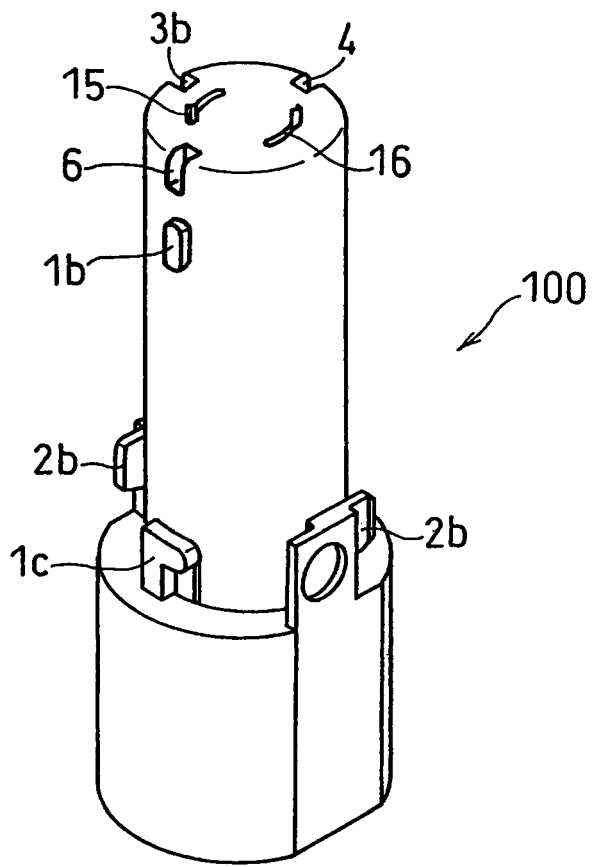
FIG. 1 is an oblique view of a battery pack in accordance with one embodiment of the present invention.
Figure 2:
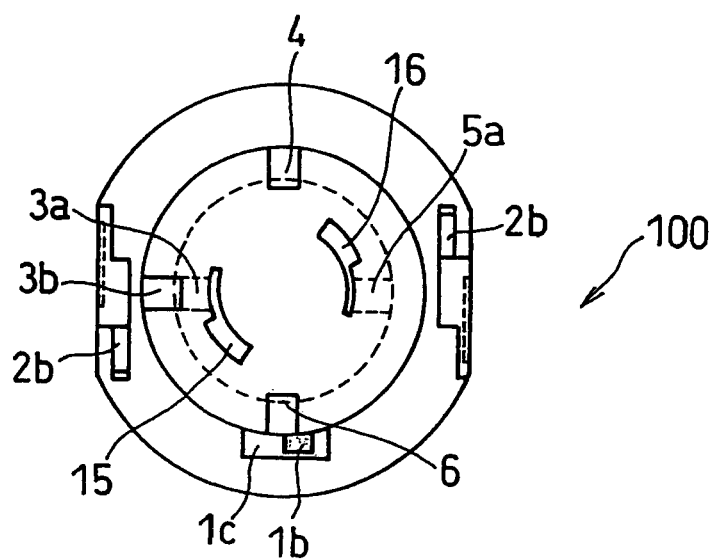
FIG. 2 is a top plan view of the battery pack in accordance with one embodiment of the present invention.
Figure 3:
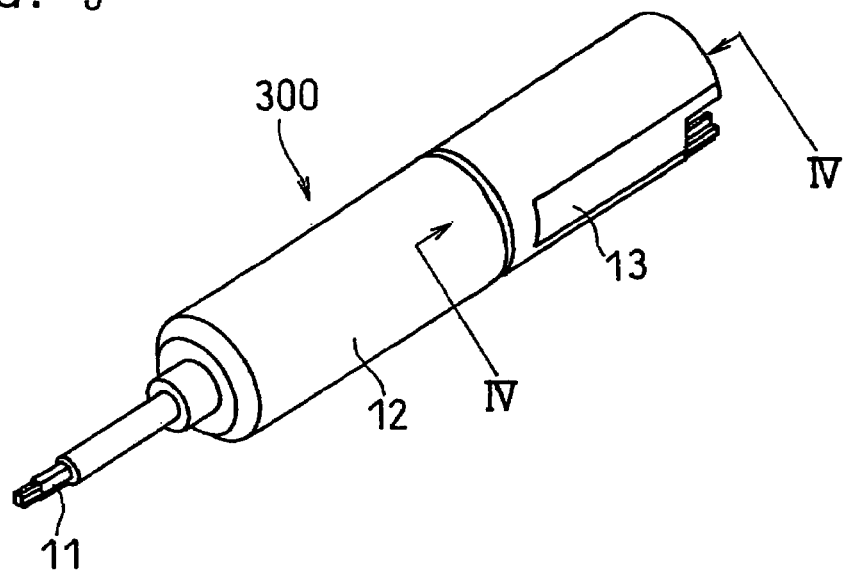
FIG. 3 is an oblique view of an electric tool in accordance with one embodiment of the present invention.

FIG. 1 is an oblique view of the battery pack 100 in accordance with the present embodiment, and FIG. 2 is a top plan view thereof. FIG. 3 is an oblique view of the electric tool 300 in accordance with the present embodiment.

Figure 4:
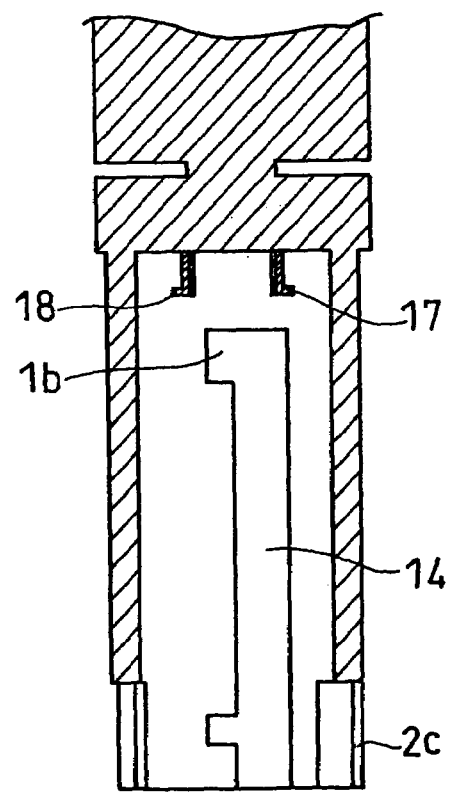
FIG. 4 is a vertical sectional view of a mounting part of the battery pack in accordance with one embodiment of the present invention.

The electric tool 300 comprises a driver bit 11, a driving part 12 and a battery pack mounting part 13. Parts not directly concerned with the content of the present invention, such as an on/off switch and a selector switch, have been omitted from FIG. 3. FIG. 4 is a vertical sectional view on the line IV—IV of the battery pack mounting part 13.

Figure 5:
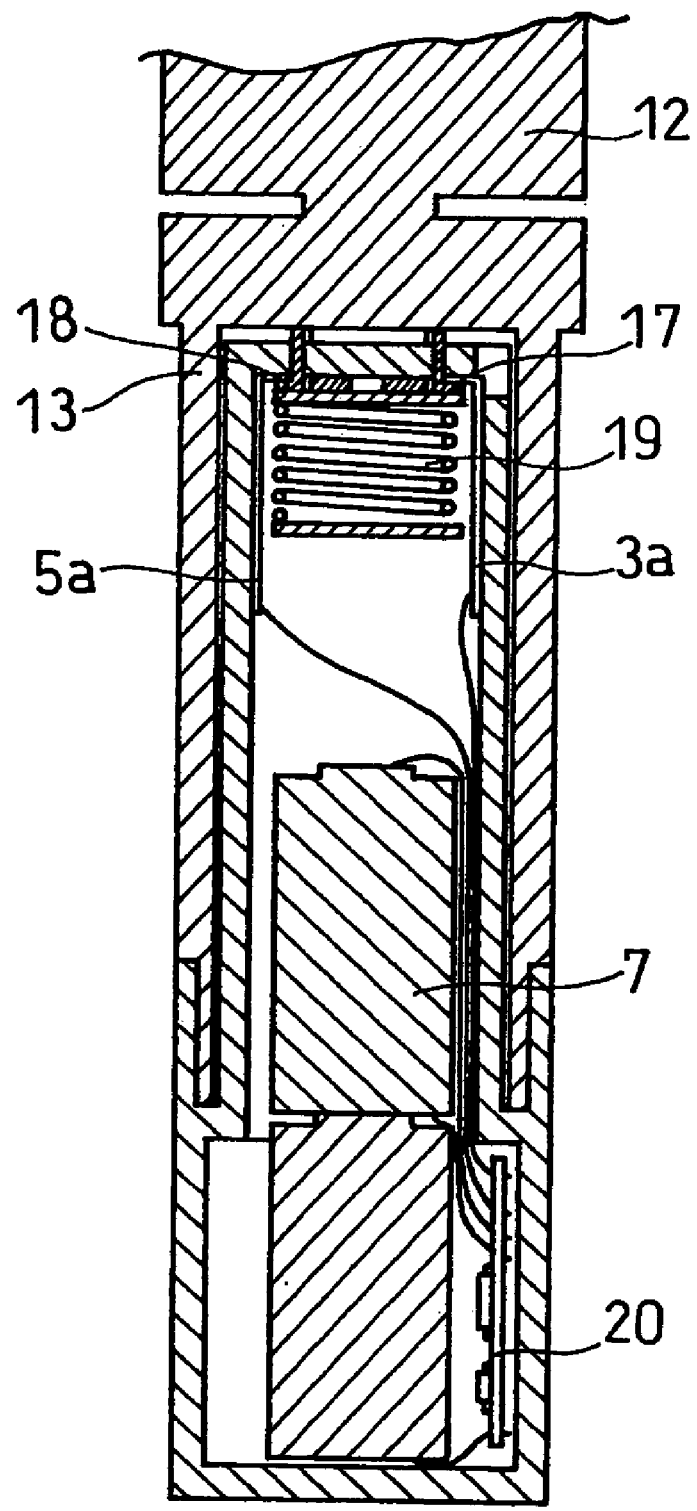
FIG. 5 is a vertical sectional view of the mounting part of FIG. 4, to which the battery pack of FIG. 1 has been connected.

FIG. 5 is a vertical sectional view of the mounting part 13 to which the battery pack 100 has been connected. The battery pack 100 comprises guides 1b and 1c for protection against reverse connection, which serve to position the battery pack when connected. The guides 1b and 1c move parallel with a guide groove 14 of the mounting part 13 so that the operation of rotating the battery pack clockwise can certainly be carried out while the battery pack has been inserted into the mounting part 13. A latch 2b is fitted in a latching groove 2c provided in the mounting part 13 by rotating the battery pack clockwise to a fixing position.

The top of the battery pack 100 is provided with a groove 15 for the positive electrode terminal and a groove 16 for the negative electrode terminal, of the discharge circuit, and a positive electrode terminal 3a and a negative electrode terminal 5a, made of a metal plate, of the discharge circuit are disposed in concealed positions inside the respective grooves.

The top of the battery pack 100 is also provided with a positive electrode terminal 3b and a negative electrode terminal 4, of the charge circuit, which are in a state not concealed but exposed to the outside. The positive electrode terminal 3b of the charge circuit is united with the positive electrode terminal 3a of the discharge circuit and they have the equivalent potential.

Figure 17:
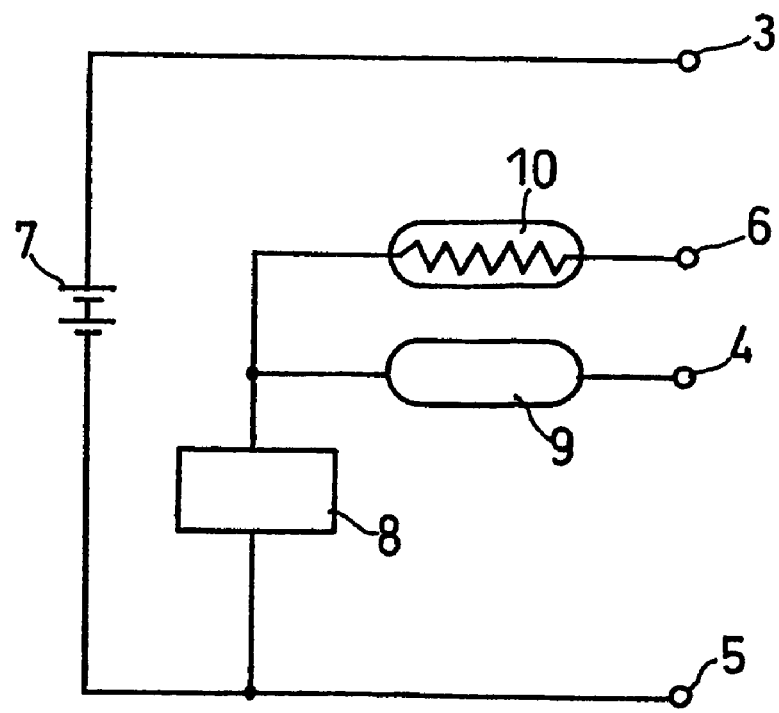
FIG. 17 is a circuit diagram of a conventional battery pack.

The top of the battery pack 100 is further provided with a thermistor terminal 6 to form, together with a thermistor housed in the battery pack, such a circuit as shown in FIG. 17.

As shown in FIG. 4, a positive electrode terminal 17 and a negative electrode terminal 18, of the mounting part 13, are in L-shape and they are first inserted into the wider portions of the groove 15 for the positive electrode terminal and the groove 16 for the negative electrode terminal, of the discharge circuit, respectively. They then move to the narrower portions by rotation of the battery pack, and the curved tips of the positive electrode terminal 17 and the negative electrode terminal 18 are connected, respectively, to the positive electrode terminal 3a and the negative electrode terminal 5a, of the discharge circuit, disposed in concealed positions, as shown in FIG. 5. A spring 19 is built into the battery pack, and the spring 19 can prevent failure of the aforesaid connection by pressing those terminals.

The battery pack 100 houses, in addition to a secondary battery 7, a control circuit, a thermistor and a thermal protector. An internal circuit including those parts is placed on a print substrate 20. The wiring of the internal circuit is the same as that of the conventional battery pack shown in FIG. 17.

As obvious from FIG. 2, in the portable power source system in accordance with the present embodiment, even when the lead wires or the like connected to a large-sized battery or the like are inserted into the groove 15 for the positive electrode terminal and the groove 16 for the negative electrode terminal, those lead wires cannot be connected to the positive electrode terminal 3a and negative electrode terminal 5a of the discharge circuit because of complete concealment of the terminals 3a and 5a from the outside. The act of charging from the discharge terminal is therefore prevented, to secure safety.

Figure 6:
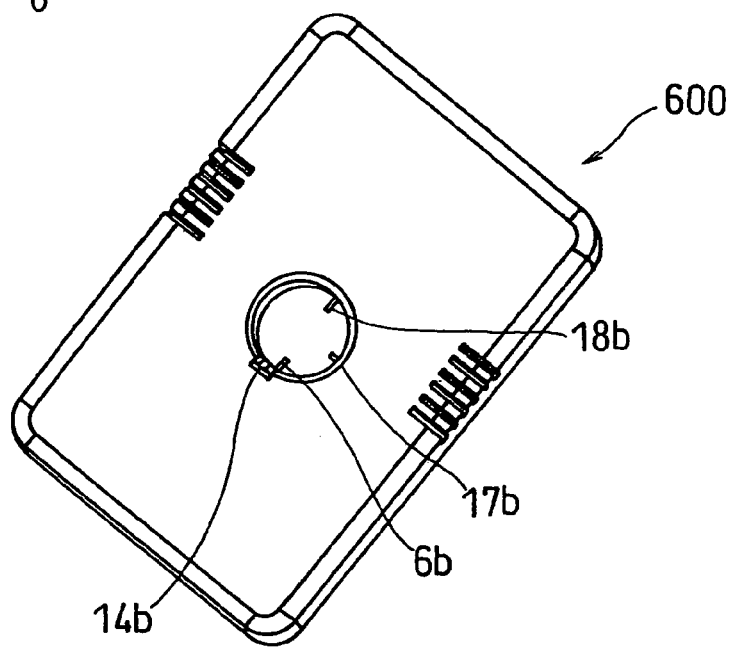
FIG. 6 is an oblique view of a charger of the battery pack in accordance with one embodiment of the present invention.

FIG. 6 shows an oblique view of a charger 600 for the battery pack 100. Parts not directly concerned with the content of the present invention, such as an on/off switch and a charged-state indication light, have been omitted from FIG. 6.

The charger 600 comprises a positive electrode terminal 17b, a negative electrode terminal 18b, a thermistor terminal 6b and a guide groove 14b. Prescribed terminals of the battery pack 100 are respectively connected to prescribed terminals of the charger 600 by fitting of the guide 1b of the battery pack 100 into the guide groove 14b of the charger 600. That is, when charging is conducted with the charger, the terminals of the battery pack and those of the charger can be mutually connected by the single action of inserting the battery pack into the charger, which can be readily operated.

It is to be noted that, although the electric tool was exemplified in the present embodiment, the types of the power using equipment are not particularly limited. Further, the similar power source system is suitable especially for electric vacuum cleaners and the like.

Embodiment 2

Below, a description is given by reference to the drawings.

In the present embodiment described is a portable power source system having a double action system where an external terminal provided on a mounting part of an electric bicycle as power using equipment is inserted into an inserting part of a battery pack, and the battery pack is then slid in a direction perpendicular to the inserting direction.

Figure 7:
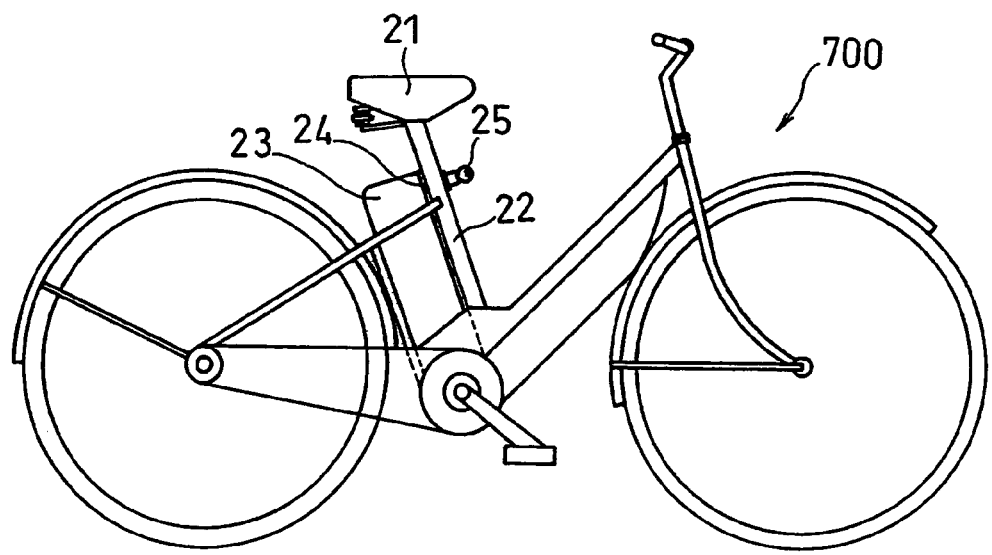
FIG. 7 is a side view of an electric bicycle in accordance with another embodiment of the present invention.

FIG. 7 is a side view of the electric bicycle 700 in accordance with the present embodiment. A mounting part 24 of a battery pack 23 is disposed on the back of a sheet tube 22 supporting a saddle 21. An antitheft key 25 is used for detachment of the battery pack 23.

Figure 8:
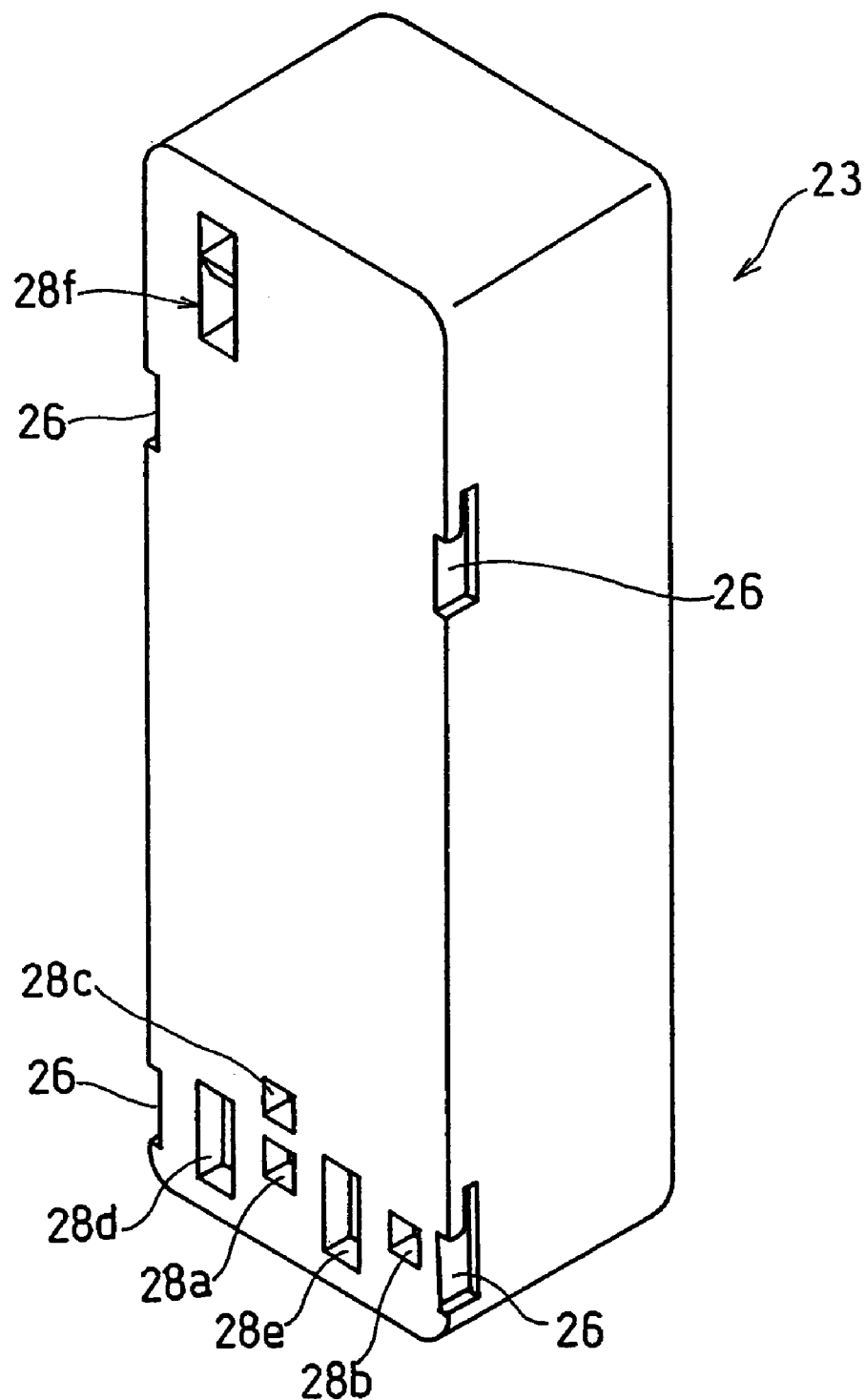
FIG. 8 is an oblique view of a battery pack in accordance with another embodiment of the present invention.
Figure 9:
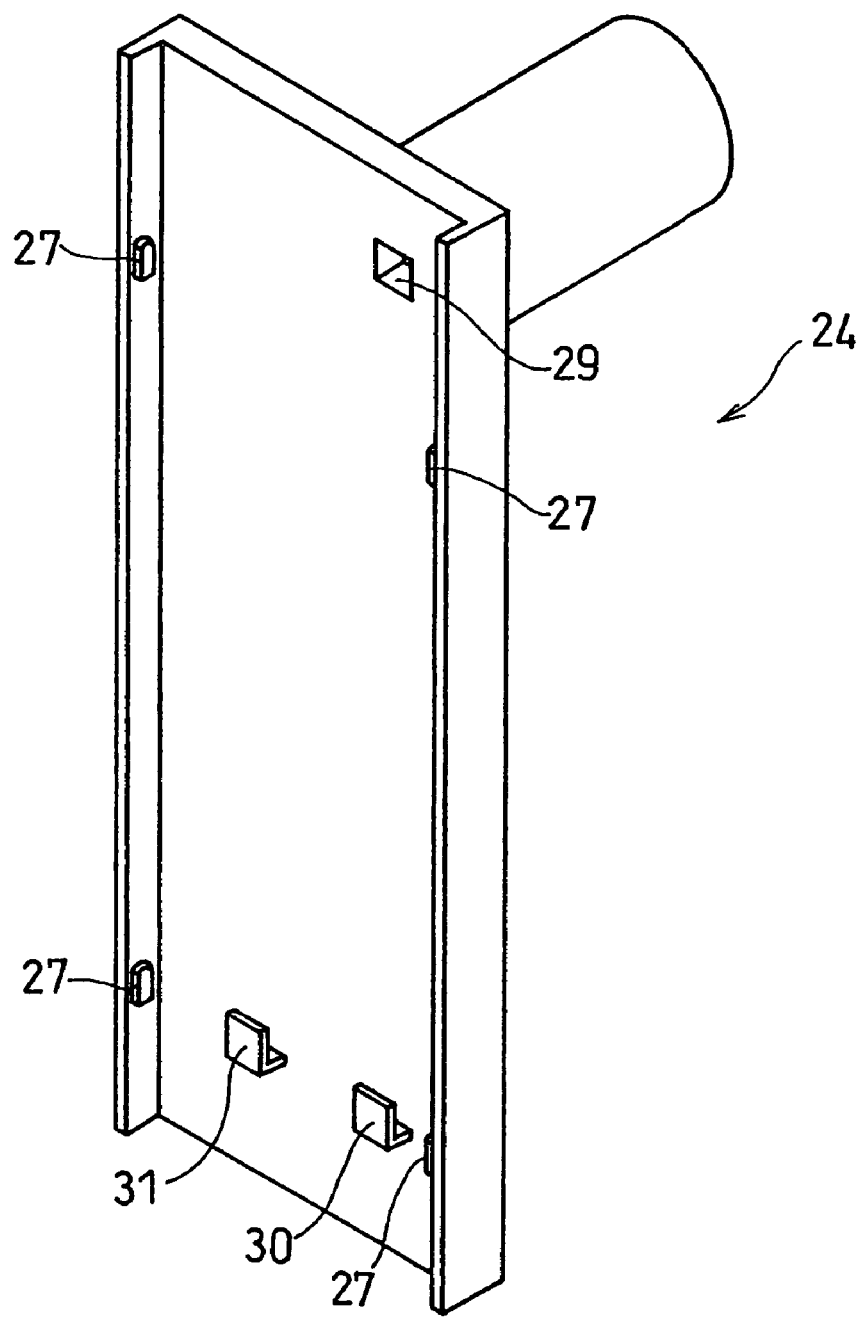
FIG. 9 is an oblique view of a mounting part of the battery pack in accordance with another embodiment of the present invention.

FIG. 8 is an oblique view of the battery pack 23 in accordance with the present embodiment, and FIG. 9 is an oblique view of the mounting part 24. A guide groove 26 is provided in each long side face of the battery pack 23, and guides 27 to be fitted in the guide grooves 26 are disposed on the mounting part 24.

For the disposition of the battery pack 23 on the mounting part 24, the battery pack 23, positioned by the guide grooves 26 and the guides 27, is first shifted vertically to the mounting face of the mounting part 24. Thereafter, the battery pack 23 is slid in parallel with the mounting face to a fixing position.

In the lower part of the back face of the battery pack 23 provided are: a concave part 28a for a positive electrode terminal, a concave part 28b for a negative electrode terminal, of a charge circuit, a concave part 28c for a thermistor terminal, and a concave part 28d for a positive electrode terminal and a concave part 28e for a negative electrode terminal, of a discharge circuit. Further, in the upper part of the back face of the battery pack 23 provided is a locking concave part 28f.

On the mounting face of the mounting part 24, a positive electrode terminal 30 and a negative electrode terminal 31, both in L-shape, are provided in a position opposed to the concave part 28d for the positive electrode terminal and to the concave part 28e for the negative electrode terminal, respectively. Further, on the mounting face, a hook window 29 is provided in a position opposed to the locking concave part 28f. On the respective concave faces of the concave part 28a for the positive electrode terminal and the concave part 28b for the negative electrode terminal, of the charge circuit, as well as the concave face of the concave part 28c for the thermistor terminal, the respective terminals are exposed.

Figure 10:
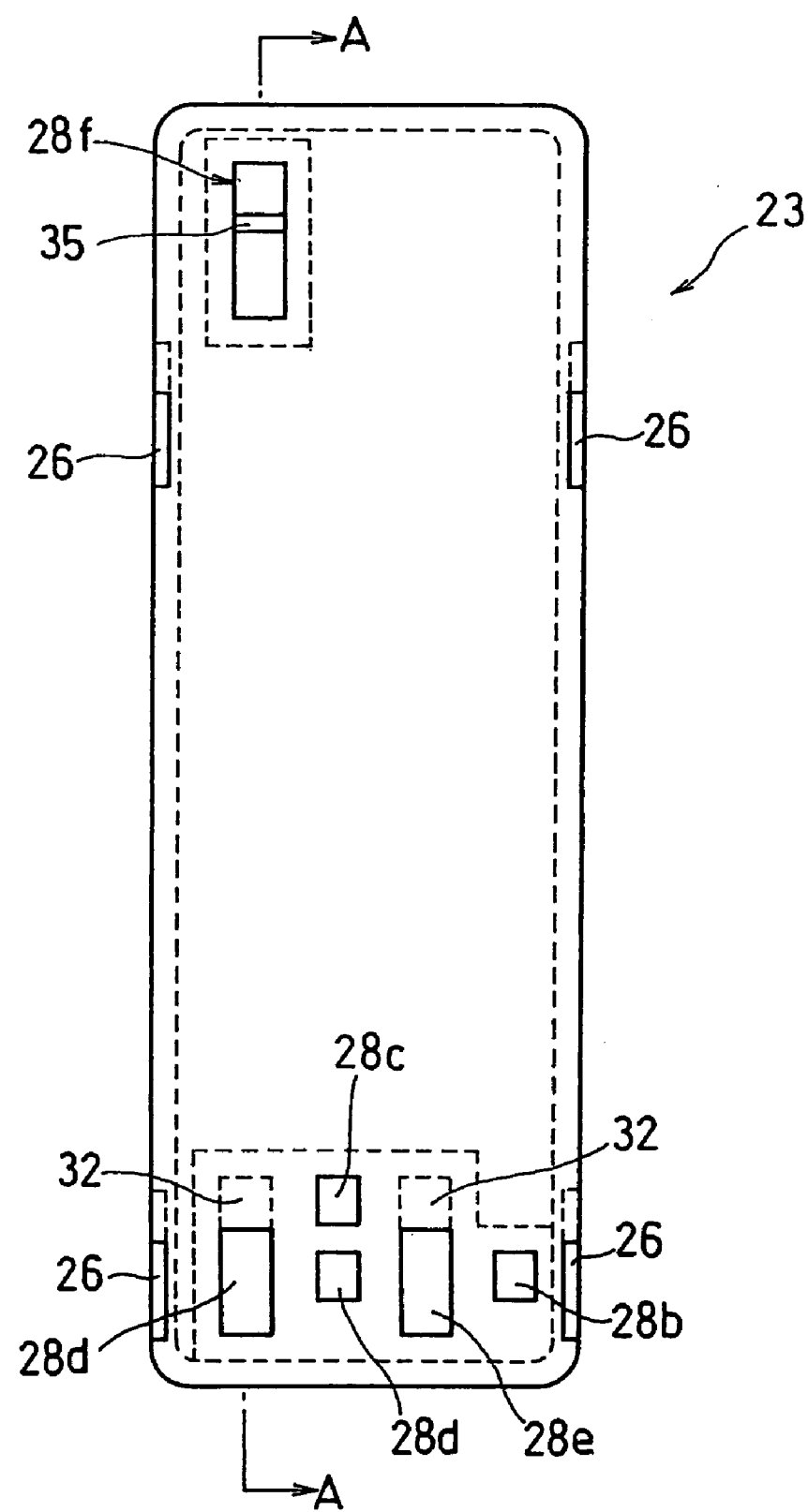
FIG. 10 is a rear view of the battery pack in accordance with another embodiment of the present invention.
Figure 11:
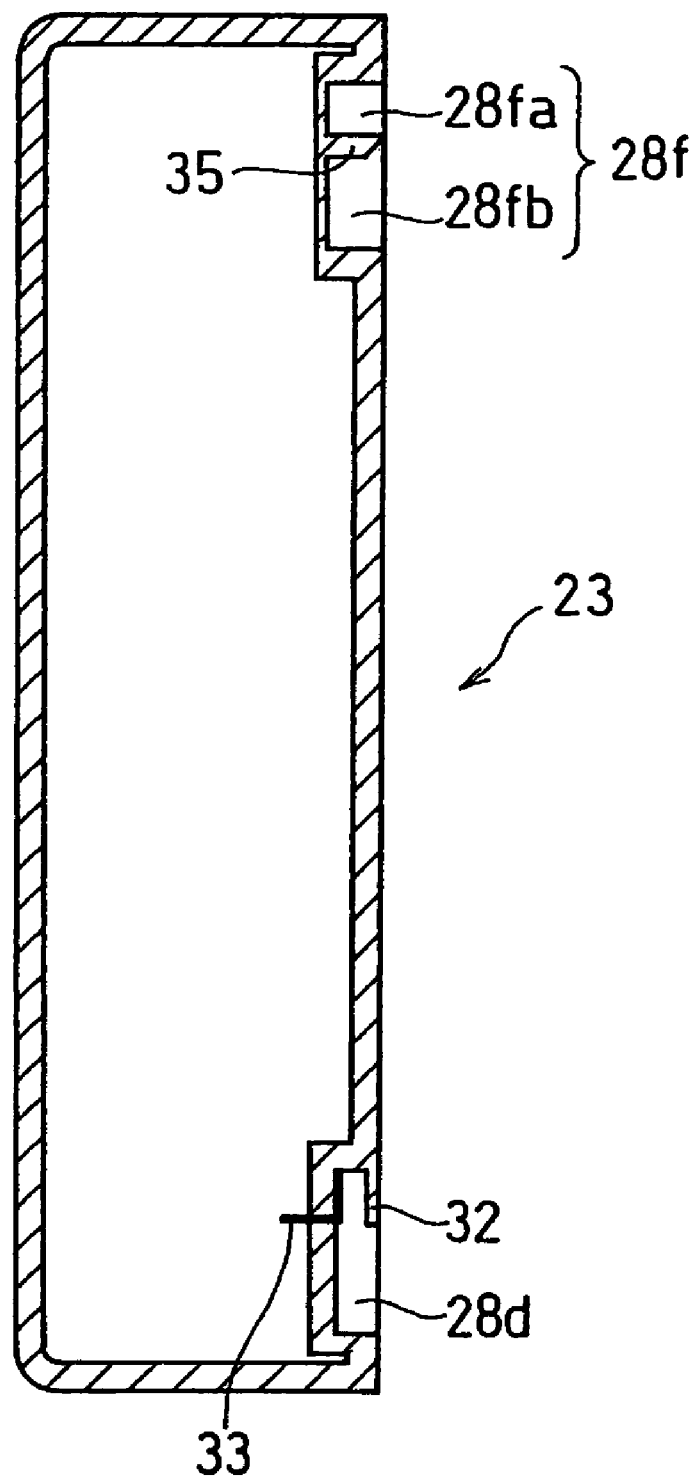
FIG. 11 is a sectional view on the line A—A of FIG. 10.

FIG. 10 is a back view of the battery pack 23 of the present embodiment, and FIG. 11 is a sectional view on the line A—A of FIG. 10. A blind plate 32 is provided each on the concave part 28d for the positive electrode terminal and the concave part 28e for the negative electrode terminal, of the discharge circuit. The positive electrode terminal 33 and the negative electrode terminal 34, of the discharge circuit, are concealed by the blind plate 32. The locking concave part 28f is divided by a partition 35 into two concave parts 28fa and 28fb.

Figure 12:
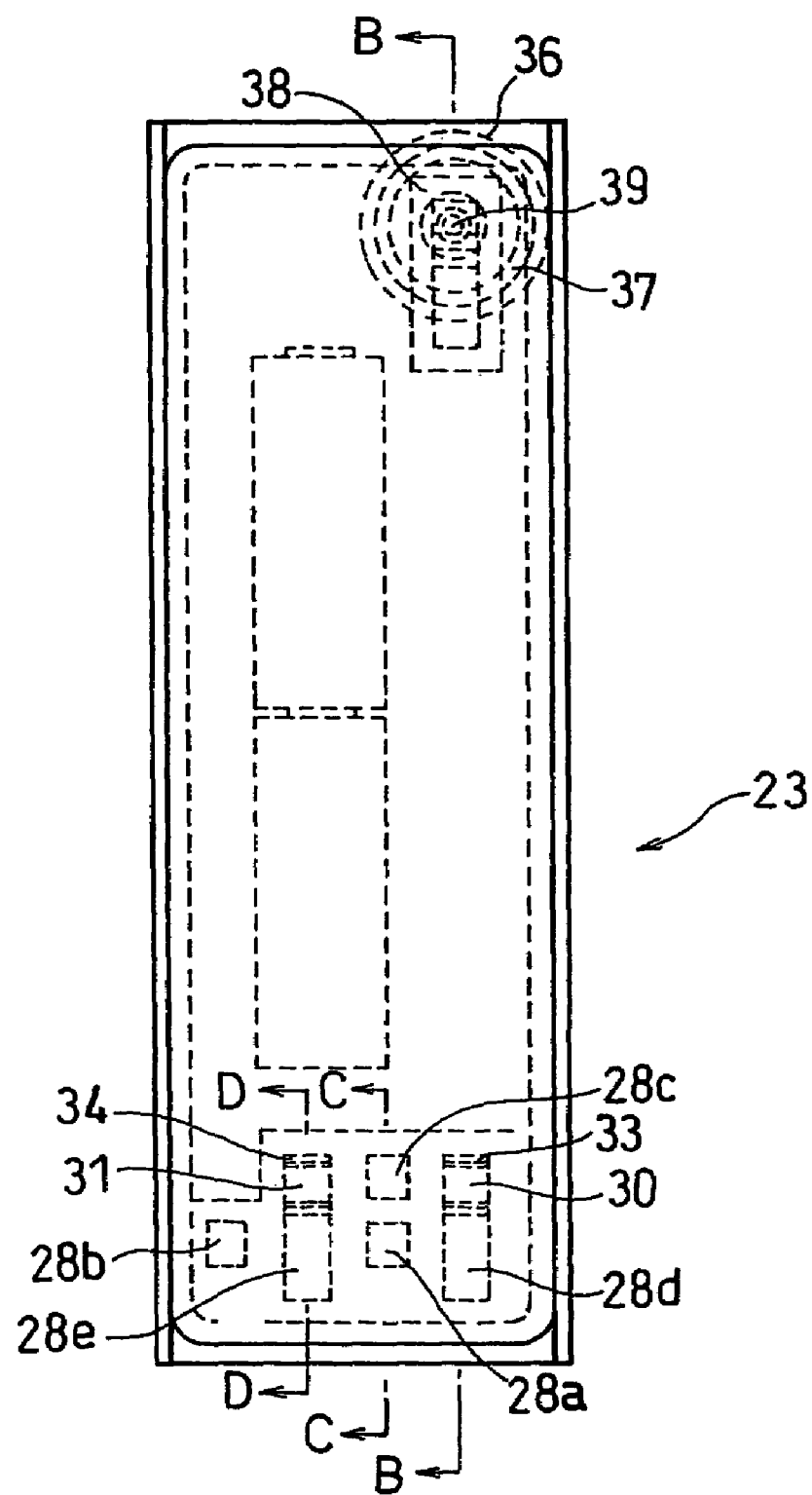
FIG. 12 is a top plan view of the battery pack of FIG. 8 connected to the mounting part of FIG. 9.
Figure 13:
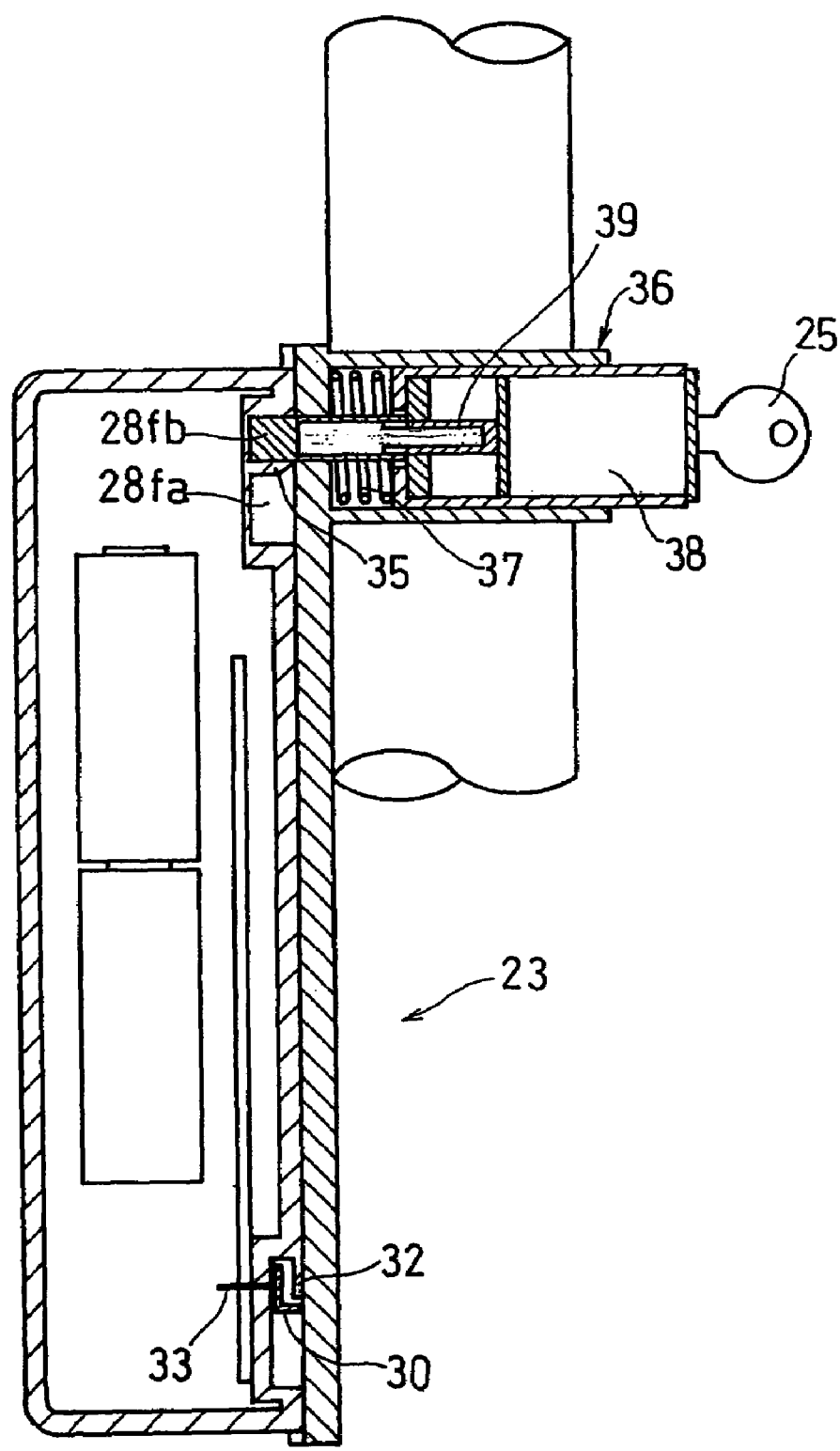
FIG. 13 is a sectional view on the line B—B of FIG. 12.

FIG. 12 shows a top plan view of the battery pack 23 connected to the mounting part 24. Although the guides 27 are fitted in the guide grooves 26 when the battery pack is in a state shown in FIG. 12, they have been omitted from FIG. 12. FIG. 13 is a sectional view on the line B—B of FIG. 12, FIG. 14A is a sectional view on the line C—C of FIG. 12, and FIG. 14B is a sectional view on the line D—D of FIG. 12.

In FIG. 13, a locking system part 36 comprises a hook 39 and a cylinder 38 supported by a spring 37. The hook 39, initially fitted in the concave part 28*fa*, is shifted over the partition 35 into the concave part 28*fb* by sliding of the battery pack 23 in parallel with the mounting face of the mounting part 24 from an initial position to a fixing position. Thereat, locking with the key 25 becomes possible.

In the initial position where the hook 39 is in a state of fitting in the concave part 28*fa*, the positive electrode terminal 33 and the negative electrode terminal 34, of the discharge circuit, provided in the battery pack 23, are not connected respectively to the positive electrode terminal 30 and the negative electrode terminal 31, of the mounting part 24. These terminals of the discharge circuit and the mounting part 24 are mutually connected by the sliding of the battery pack thereafter. As shown in FIG. 14A, on the other hand, a thermistor terminal 40, a positive electrode terminal 41 of the charge circuit and the like, to be used during charging, are closed with a lid.

Figure 14:
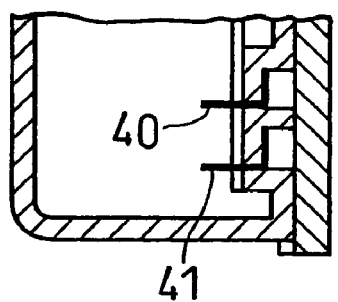
FIG. 14A is a sectional view on the line C—C of FIG. 12.
FIG. 14B is a sectional view on the line D—D of FIG. 12.
Figure 14:
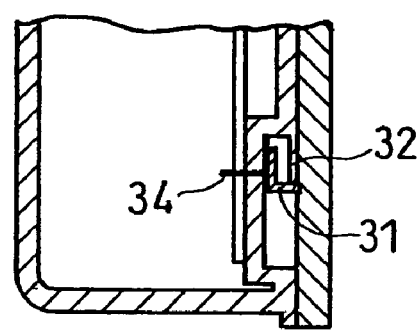
Figure 15:
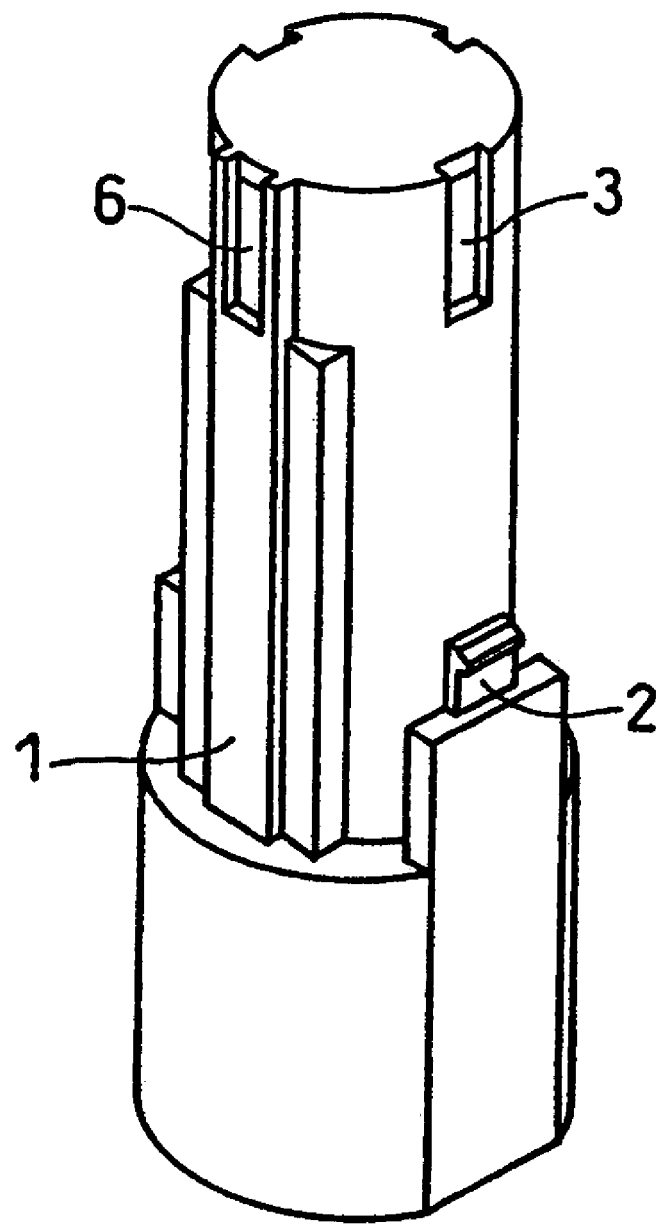
FIG. 15 is an oblique view of one example of conventional battery packs.
Figure 16:
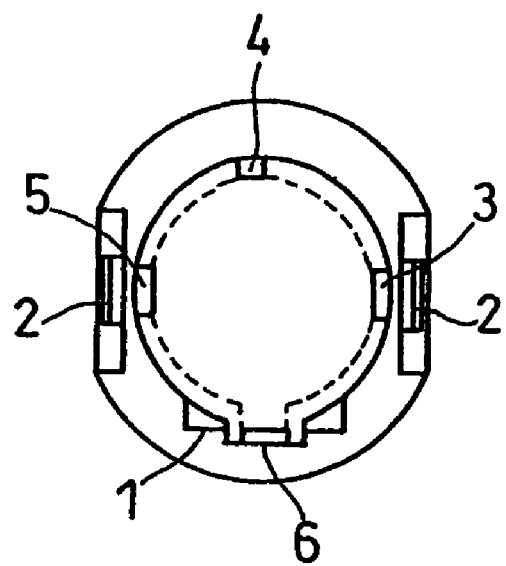
FIG. 16 is a top plan view of one example of conventional battery packs.

Also in the present embodiment, the positive electrode terminal 33 and the negative electrode terminal 34, of the discharge circuit, are disposed in a position concealed by the blind plate 32, as evident from FIGS. 13 and 14B. Even with insertion of lead wires or the like connected to a large-sized battery or the like into the concave part 28*d* for the positive electrode terminal and the concave part 28*e* for the negative electrode terminal, therefore, the lead wires can be connected to neither the terminals 33 nor 34. Hence the act of charging from the discharge terminal is prevented so as to secure safety.

It should be noted that, although the electric bicycle was exemplified in the present embodiment, the types of the power using equipment are not particularly limited. Further, the similar power source system is suitable especially for electric motorbikes.

As thus described, according to a portable power source system of the present invention, the discharge terminal is disposed in a concealed portion to enable the connection between the discharge terminal and the external terminal by a double action system so that high safety can be secured with a simple structure.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A portable power source system comprising a battery pack for accommodating at least one secondary battery and a mounting part for mounting said battery pack,
    said mounting part being disposed in power using equipment,
    said battery pack comprising a charge circuit having a charge terminal and a discharge circuit having a discharge terminal, and said charge circuit comprising a control circuit for controlling a voltage and a current during charging,
    said mounting part comprising a protruding external terminal for connecting with said discharge terminal, said battery pack comprising an inserting part for inserting said external terminal, and said discharge terminal being disposed in a concealed position inside said inserting part,
    said battery pack being movable from an initial position to a fixing position while said external terminal has been inserted in said inserting part, and connection between said external terminal and said discharge terminal being achieved at said fixing position, and
    said battery pack being movable from the initial position to the fixing position in a direction different from the inserting direction.

2. The portable power source system in accordance with claim 1, wherein said charge terminal and discharge terminal respectively comprise both a positive electrode terminal and a negative electrode terminal, and said negative electrode terminals are mutually electrically independent while said positive electrode terminals are united and have equivalent potential.

3. The portable power source system in accordance with claim 1, wherein said battery pack comprises a thermistor terminal for temperature measurement.

4. The portable power source system in accordance with claim 1, wherein said charge circuit further comprises a thermal protector.

5. The portable power source system in accordance with claim 1, wherein said discharge circuit does not comprise a current regulating device.

6. The portable power source system in accordance with claim 1, wherein said charge terminal is not concealed but exposed to the outside.

7. The portable power source system in accordance with claim 1, wherein said secondary battery is a lithium-ion secondary battery.

8. The portable power source system in accordance with claim 1, wherein said power using equipment is an electric tool, an electric vacuum cleaner, an electric bicycle or an electric motorbike.

9. A portable power source system comprising a battery pack for accommodating at least one secondary battery and a mounting part for mounting said battery pack,
    said mounting part being disposed in power using equipment,
    said battery pack comprising a charge circuit having a charge terminal and a discharge circuit having a discharge terminal, and said charge circuit comprising a control circuit for controlling a voltage and a current during charging,
    said mounting part comprising a protruding external terminal for connecting with said discharge terminal, said battery pack comprising an inserting part for inserting said external terminal, and said discharge terminal being disposed in a concealed position inside said inserting part,
    said battery pack being movable from an initial position to a fixing position while said external terminal has been inserted in said inserting part, and connection between said external terminal and said discharge terminal being achieved at said fixing position, and
    said battery pack being rotatable from the initial position to the fixing position.

* * * * *